July 31, 1923.
L. S. PADDOCK
DETACHABLE ARMREST FOR AUTOMOBILES OR THE LIKE
Filed July 1, 1922
1,463,293
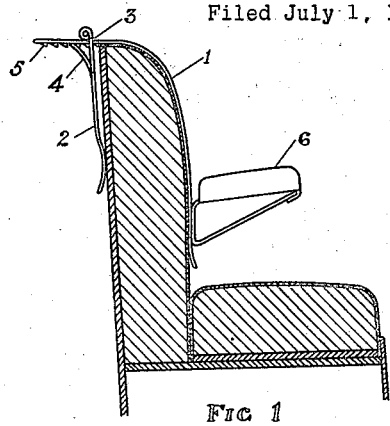
Fig. 1
Fig. 2
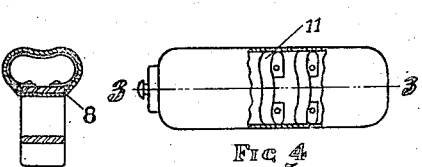
Fig. 5 Fig. 4
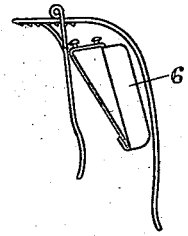
Fig. 6
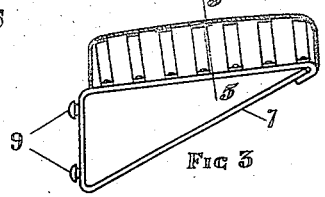
Fig. 3
Fig. 7
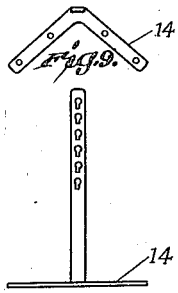
Fig. 9
Fig. 8
INVENTOR
Laurence S. Paddock Patented July 31, 1923.

1,463,293

UNITED STATES PATENT OFFICE.

LAWRENCE S. PADDOCK, OF PHILADELPHIA, PENNSYLVANIA.

DETACHABLE ARMREST FOR AUTOMOBILES OR THE LIKE.

Application filed July 1, 1922. Serial No. 572,161.

*To all whom it may concern:*

Be it known that LAWRENCE S. PADDOCK, a citizen of the United States, residing at Philadelphia, Pa., has invented new and useful Improvements in Detachable Armrests for Automobiles or the like, of which the following is a specification.

This invention relates to an improved arm rest for use on automobiles or other vehicles.

It is an object of my invention to provide an arm rest which is particularly adapted to relieve the arm strain on the driver of an automobile which is occasioned by the prolonged extension of the driving arm when manipulating the steering wheel.

To relieve this condition I have provided an arm rest which forms a support for the extended arm of the driver which gives the needed relief from strain and enables the driver to continue driving for long periods of time with comfort and freedom from the fatiguing effects mentioned.

It is also an object of my invention to construct an improved arm rest so that it may be adjusted to the desired position and removed with ease.

A further object is to construct the portion upon which the driver's arm rests in such a manner that it can be adjusted to the desired vertical position best suited to the particular conditions and be removed without disturbing any of the parts thereof.

Another object is to construct the detachable rest and its support so that the parts may be packed in a compact space for storage or carrying purposes. Other objects will appear in the detailed description.

In the drawings Fig. 1 is a side view showing my improved arm rest in place upon the back of an automobile seat. Fig. 2 is a front view of the hanger showing the slots therein. Fig. 3 is a side view, partly in section, taken on the line 3—3 of Fig. 4 showing the detachable arm support. Fig. 4 is a plan view of the detachable arm support. Fig. 5 is a cross section taken on line 5—5 on Fig. 3. Fig. 6 is a side elevation showing the parts of my arm rest in position for storage. Fig. 7 is a side view of a modification in which the arm supporting part is mounted on a vertical member whose base extends at right angles to the vertical portion and underneath the seat cushion. Fig. 8 is a front view of the arm rest shown in Fig. 7. Fig. 9 is a plan view of the support as shown in Fig. 8.

In the drawings 1 is the front member of a curved hanger preferably made of spring steel and formed so as to conform to the shape of the back of the seat. 2 is the rear member of the hanger and is provided at the upper end with an opening 3 thru which the front member 1 passes as shown. 4 is a projection on the rear member 2 adapted to selectively engage the projections 5 on the front member 1. With this construction the hanger is readily adjusted to different seats having backs of varying thickness. The rear member 2 may be moved to the desired position on the front member 1 so that the hanger will be firmly clamped on the back of the seat by spring tension. The rear member 2 is held in position by the interaction of the projections 4 and 5. The outward pressure on the rear member 2 tends to keep the projections 4 and 5 in contact. To the front member 1 of the hanger is attached a removable arm support 6. The arm supports 6 comprises a frame 7, preferably of triangular form, fashioned from a metal strip and is provided with a resilient cushion at 8. On the rear side of the frame 7 are placed buttons 9 which may be composed of rivets having the heads thereof projecting beyond the metal strip of the frame 7. Slots 10 are cut in the front member 1 of hanger at spaced intervals. These slots are formed with an enlarged portion of a size capable of allowing the heads of the buttons 9 to pass therethru with connecting narrower portions having a width sufficiently great to allow the shanks of the buttons 9 to pass thru them but not the heads thereof. The slots are spaced in the member 1 at such a distance as will permit the pair of buttons 9 to be simultaneously inserted in a pair of slots. After the heads of the buttons are inserted thru the upper portions of a pair of slots the arm support 6 may be lowered until the shanks of the buttons 9 rest at the bottom of the narrower portions of the slots 10. Thus the arm support 6 is firmly held in the desired position but may be easily removed by raising the same and withdrawing the buttons 9 thru the upper enlarged portions of the slots 10. A series of slots 10 are provided, as shown, so that the arm support 6 may be placed in a vertical position best suited to the particular conditions involved.

In the embodiment of my invention herein shown the resilient cushion 8 is composed of spring steel strips 11 of the form shown, which are fastened to the top portion of the frame 7. This may be accomplished by any suitable method such as riveting or spot welding. The spring strips 11 form a skeleton structure of the resilient cushion 8 and are covered with a pliable fabric such as canvas. The cushion 8 is preferably covered with a finishing fabric such as is used on cushions of automobiles. A thin layer of padding may be placed between the finishing fabric and the canvas on the top portion of the cushion 8.

The arm support 6 is preferably given an upward angle in order to conform to the angle of the driver's arm when operating the steering wheel. This angularity also compensates for any lowering of the arm support by the pressure exerted thereon by the driver's arm forcing the hanger backwardly into the cushion of the seat. The resilient form of arm cushion herein shown has been found to be advantageous when riding over rough roads which cause the body of the driver to rise and fall with the action of the cushion upon which he is seated thus imparting a similar motion to his arm. The driver's arm which rests on the arm support 6 is thus cushioned by the resiliency of the cushion 8 against any discomforting blows and may remain in steady contact with the support. The arm support 6 is preferably made of such a length as not to interfere with the easy manipulation of the gear shifting lever.

In Fig. 6 I have shown my improved arm rest in disassembled condition. The arm support 6 is nested within the curved portion of the hanger which permits of storage in a compact and convenient manner.

In Figs. 7 and 8 I have shown a modification which is particularly adapted for use in enclosed cars or runabouts where a panel or curtain rises from the top of the seat. The arm support 6 in Fig. 7 is of the same construction as above described and attaches to the support 12 in a similar manner. The support 12 is so formed as to rest upon the seat 13 and has a base portion 14 extending under the cushion 15 at right angles to the vertical member of the support 12. The vertical member of the support 12 is provided with slots as described for the reception of the buttons 9 on the frame 7 of the arm support 6.

By the foregoing description it will be seen that I have provided an arm rest which is capable of being placed at the desired lateral position on the back of the seat and whose arm supporting member may be given the desired vertical adjustment. With the construction shown my arm rest may be easily placed in position, removed, disassembled and neatly packed for storage. The construction of the hanger herein set forth is particularly adapted for production by stamping machinery.

Having described my invention what I claim is:

1. In an article of the class described, in combination, a carrying member having front and rear portions adapted to slip over and grip the back of a seat, said rear portion being adjustable on said front portion and a freely removable arm support attached to said front portion thereof.

2. In an article of the class described, in combination, a carrying member having front and rear portions adapted to slip over and grip the back of a seat, said rear portion being movable on said front portion and having a member contacting with said front portion in such a manner as to hold said rear portion in the desired position on said front portion and an arm support attached to said front portion.

3. In an article of the class described, in combination, a carrying member having front and rear portions adapted to slip over and grip the back of a seat, said rear portion being movable on said front portion and having a member contacting with said front portion in such a manner as to hold said rear portion in the desired position on said front portion and an adjustable and freely removable arm support attached to said front portion.

4. In an article of the class described, in combination, a vertical resilient carrying member having front and rear portions adapted to be positioned on the back of a seat and grip said back between said portions by self imposed spring tension and having openings formed in said front portion and an arm support having projections thereon adapted to pass thru said openings and be removably held by said carrying member.

5. In an article of the class described, in combination, a vertical resilient carrying member having front and rear portions adapted to be positioned on the back of a seat and grip said back between said portions by self imposed spring tension and having openings in said front portion formed with an enlarged portion and a narrower lower portion and an arm support having projections thereon provided with enlarged heads of greater width than the narrow portion of said slots and with narrower shanks of less width than the narrow portion of said slots, said heads being adapted for insertion thru the enlarged upper portions of said slots and said narrower shanks being adapted to be lowered thru said narrower lower portion of said slots to the bottom thereof whereby said arm support is firmly held by said carrying member and freely removable therefrom.

6. In an article of the class described, in combination, a vertical resilient carrying member having front and rear portions adapted to be positioned on the back of a seat and grip said back between said portions by self imposed spring tension and having openings formed in said front portion, an arm support comprising a triangular frame having a resilient cushion attached to one side thereof and projections on another side thereof adapted to pass thru said openings and be removably held by said carrying member.

In testimony whereof, I have signed my name to this specification in the presence of two subscribing witnesses, this 23rd day of June, 1922.

LAWRENCE S. PADDOCK.

Witnesses:
EDWARD A. JONES,
L. DOCOSLEY PRICE.